United States Patent
Shibahara et al.

(10) Patent No.: US 11,805,793 B2
(45) Date of Patent: *Nov. 7, 2023

(54) FEED ADDITIVE COMPOSITION FOR RUMINANTS

(71) Applicant: AJINOMOTO CO., INC., Tokyo (JP)

(72) Inventors: Susumu Shibahara, Kawasaki (JP); Sachiko Yonemaru, Kawasaki (JP); Koji Haga, Kawasaki (JP); Yuki Miyazawa, Kawasaki (JP); Takaaki Sato, Ueda (JP)

(73) Assignee: AJINOMOTO CO., INC., Tokyo (JP)

(*) Notice: Subject to any disclaimer, the term of this patent is extended or adjusted under 35 U.S.C. 154(b) by 94 days.

This patent is subject to a terminal disclaimer.

(21) Appl. No.: 17/362,460

(22) Filed: Jun. 29, 2021

(65) Prior Publication Data

US 2021/0321642 A1 Oct. 21, 2021

Related U.S. Application Data

(63) Continuation of application No. 16/394,594, filed on Apr. 25, 2019, now Pat. No. 11,076,618, which is a continuation of application No. PCT/JP2017/039006, filed on Oct. 27, 2017.

(30) Foreign Application Priority Data

Oct. 27, 2016 (JP) ................................. 2016-211131

(51) Int. Cl.
| | |
|---|---|
| *A23K 50/10* | (2016.01) |
| *A23K 40/30* | (2016.01) |
| *A23K 20/142* | (2016.01) |
| *A23K 20/174* | (2016.01) |
| *A23K 20/158* | (2016.01) |
| *A23K 10/20* | (2016.01) |
| *A23K 10/30* | (2016.01) |

(52) U.S. Cl.
CPC .............. *A23K 50/10* (2016.05); *A23K 10/20* (2016.05); *A23K 10/30* (2016.05); *A23K 20/142* (2016.05); *A23K 20/158* (2016.05); *A23K 20/174* (2016.05); *A23K 40/30* (2016.05)

(58) Field of Classification Search
None
See application file for complete search history.

(56) References Cited

U.S. PATENT DOCUMENTS

| | | | |
|---|---|---|---|
| 3,804,776 | A | 4/1974 | Yazawa et al. |
| 5,496,571 | A | 1/1996 | Blagdon |
| 6,238,727 | B1 | 5/2001 | Takemoto et al. |
| 8,137,719 | B2 | 3/2012 | Bevans et al. |
| 8,182,851 | B2 | 5/2012 | Roman et al. |
| 2006/0045957 | A1 | 3/2006 | Bevans et al. |
| 2007/0148212 | A1 | 6/2007 | Okutani et al. |
| 2009/0232933 | A1 | 9/2009 | Nakazawa et al. |
| 2011/0081444 | A1 | 4/2011 | Nakazawa et al. |
| 2012/0244248 | A1 | 9/2012 | Wright et al. |
| 2013/0095206 | A1 | 4/2013 | Nakazawa et al. |
| 2014/0308412 | A1 | 10/2014 | Nakazawa et al. |
| 2014/0308418 | A1 | 10/2014 | Nakazawa et al. |

FOREIGN PATENT DOCUMENTS

| | | |
|---|---|---|
| JP | 49-45224 B1 | 12/1974 |
| JP | 2000-60440 A | 2/2000 |
| JP | 2005-312380 A | 11/2005 |
| JP | 2008-148696 A | 7/2008 |
| JP | 50404919 B2 | 7/2012 |
| WO | WO 2008/041371 A1 | 4/2008 |
| WO | WO 2009/122750 A1 | 10/2009 |

OTHER PUBLICATIONS

Extended European Search Report dated Jul. 13, 2020 in European Patent Application No. 17866033.6, 7 pages.
Scholfield, C.R., "Composition of Soybean Lecithin", Journal of American Oil Chemists' Society, vol. 58, No. 10, Oct. 1981, XP055463512, pp. 889-892.
Jana Orsavova et al., Fatty Acids Composition of Vegetable Oils and Its Contribution to Dietary Energy Intake and Dependence of Cardiovascular Mortality on Dietary Intake of Fatty Acids; Int. J. Mol. Sci. 2015, 16, 12871-12890—20 pages (Year: 2015).

*Primary Examiner* — Jyoti Chawla
(74) *Attorney, Agent, or Firm* — Oblon, McClelland, Maier & Neustadt, L.L.P.

(57) ABSTRACT

Feed additive compositions for ruminants containing (A) at least one member selected from the group consisting of hydrogenated vegetable oil and hydrogenated animal oil each having a melting point of higher than 50° C. and lower than 90° C.; (B) not less than 0.05 wt % and not more than 6 wt % of lecithin; (C) not less than 30 wt % and less than 65 wt % of a biologically active substance; (D) not less than 0.01 wt % and less than 0.8 wt % of a natural vegetable oil; and not less than 0.1 wt % and less than 6 wt % of water exhibit high protection in the rumen and are also superior in dissolution in the lower gastrointestinal tract.

20 Claims, 4 Drawing Sheets

FEED ADDITIVE COMPOSITION FOR RUMINANTS

CROSS REFERENCES TO RELATED APPLICATIONS

This application is a continuation of U.S. application Ser. No. 16/394,594, filed Apr. 25, 2019, which is a continuation of International Patent Application No. PCT/JP2017/039006, filed on Oct. 27, 2017, and claims priority to Japanese Patent Application No. 2016-211131, filed on Oct. 27, 2016, both of which are incorporated herein by reference in their entireties.

BACKGROUND OF THE INVENTION

Field of the Invention

The present invention relates to feed additive compositions for ruminants. More particularly, the present invention relates to feed additive compositions for ruminants that are provided with high protection in the rumen and are superior in dissolution in the gastrointestinal tract.

Discussion of the Background

When ruminants ingest feed, the microorganisms living in the first stomach (rumen) absorb a part of the nutrients in the feed as a nutrient source. Due to this function, ruminants can absorb, as nutrients, substances that cannot be digested directly. For example, microorganism digests cellulose to produce saccharides and produces volatile organic compounds by fermentation with the saccharides. Ruminants absorb such products as nutrition. On the other hand, a nutrient source desired to be directly absorbed by the ruminant is also digested by the microorganism and the ruminant can absorb only the substance produced by the microorganism by fermentation.

To improve the health condition of ruminants and improve the producibility of the products thereof (e.g., cow's milk, edible meat etc.), it is sometimes desirable to add a nutrient that complements general feeds.

In such cases, to ensure that the biologically active substance (nutrient) is not ingested by microorganism but effectively absorbed, a feed additive preparation for ruminants that protects the nutrient in the rumen and makes the nutrient absorbed in the gastrointestinal tract after the fourth stomach is used.

In feed preparations for ruminants such as lactating cows and the like, a biologically active substance as a nutrient has conventionally been covered with fat or oil or the like for the purpose of improving protection of the biologically active substance in the rumen. In addition, a fat or oil having a dissolution promoting effect is sometimes used for the purpose of improving dissolution in the gastrointestinal tract and the like. For example, low melting point fats and oils are easily decomposed by intestinal digestive enzymes such as lipase and the like, and it has been reported that dissolution of a biologically active substance in the gastrointestinal tract can be improved by adding such fat or oil (see JP-B-49-45224, which is incorporated herein by reference in its entirety). Also, a substance other than fats and oils is sometimes used. For example, lecithin is sometimes used as a promoter of dissolution of a biologically active substance from a feed preparation in the gastrointestinal tract of ruminants in view of the action thereof as an emulsifier.

On the other hand, when a ruminant ingests a feed preparation, the feed preparation stays in the rumen (the first stomach) for a few hours to some tens of hours, and therefore, a part of the biologically active substance is ingested by the microorganism always existing in the rumen such as protozoa and the like. Dissolution promoters such as lecithin and low melting point fat or oil induce dissolution of biologically active substances in the rumen and, as a result, a problem occurs that the protection of the feed preparation in the rumen becomes low.

JP-A-2005-312380, which is incorporated herein by reference in its entirety, describes a method for producing a dispersion type rumen bypass agent solidified into a sphere with a diameter of 0.5 to 3 mm by a spray granulation method for spraying a mixture containing hydrogenated oil as a protector, lecithin and a monocarboxylic acid salt of an unsaturated or saturated fatty acid having a carbon number of 12 to 22 into the air at a melting temperature of the protector (50 to 90° C.). JP-A-2005-312380 discloses that a rumen bypass agent superior in the protection in the first stomach and releaseability in the fourth stomach is obtained by containing lecithin and stearic acid. On the other hand, JP-A-2005-312380 describes that a rumen bypass agent containing 40.0 wt % of L-lysine hydrochloride can be produced by the production method. However, the production method described in JP-A-2005-312380 requires use of a mixture having low viscosity for passage through a spray nozzle, and an L-lysine hydrochloride-containing preparation having a high content exceeding 40 wt % cannot be obtained.

JP Patent No. 5,040,919, which is incorporated herein by reference in its entirety, describes a dispersion type feed additive composition for ruminants, which contains at least one kind of a protector selected from a hydrogenated vegetable oil or hydrogenated animal oil having a melting point of higher than 50° C. and lower than 90° C., lecithin, not less than 40 wt % and less than 65 wt % of a basic amino acid and 0.01 to 6 wt % of water. This composition contains a high content of not less than 40 wt % of a basic amino acid. JP Patent No. 5,040,919 describes that the composition has a protection rate improving effect by 0.06 wt % of lecithin and a protection rate improving effect by controlling water content, and can achieve a high rumen passage rate.

US-A-2012/244248, which is incorporated herein by reference in its entirety, describes a ruminant feed additive in which granulated lysine sulfate (particle size 0.3 to 3 mm) is coated with not less than 2 layers (desirably not less than 4 layers) of a mixture of hydrogenated oil and a modifying agent of any of lecithin, stearic acid, oleic acid and palm oil. The content of a lysine sulfate granulation product in the feed additive is not less than 50% and not more than 60% (not less than 37% and not more than 45% based on lysine hydrochloride). The feed additive contains 0.5 to 10% of a modifying agent and, in the Examples of US-A-2012/244248, 2 to 4% of a modifying agent is added. When a modifying agent is used, small scratches, cracks and pinholes in the coating layer of this preparation can be reduced. US-A-2012/244248 describes that the rumen bypass rate of the above-mentioned feed additive is not less than 50% and the small intestine digestion rate is not less than 70%.

On the other hand, the property of a coating type feed additive markedly decreases when a ruminant cracks the feed by chewing.

U.S. Pat. No. 8,137,719, which is incorporated herein by reference in its entirety, describes a preparation produced by uniformly mixing a fatty acid salt, vegetable oil and lysine hydrochloride and molding the obtained pellets. The preparation contains 15 to 25% of lysine and contains 1 to 5% of vegetable oil. In the preparation, vegetable oil is used as a liquefiable conditioner, and not only vegetable oil but also oil, fat, free fatty acid, lipid, lecithin, wax and the like may also be used. U.S. Pat. No. 8,137,719 does not describe a clear role of a liquefiable conditioner, but describes that a fatty acid salt and a liquefiable conditioner form a uniform mixture. The lysine content described in the Examples of U.S. Pat. No. 8,137,719 is 18.6 to 31% based on lysine hydrochloride and the content cannot be said to be high.

U.S. Pat. No. 8,182,851, which is incorporated herein by reference in its entirety, describes a preparation in which lysine hydrochloride is coated with a calcium salt of palm oil distillation residue (PFUD) and fatty acid calcium. In the preparation, the calcium salt is dissolved under acidic conditions after rumen passage and lysine hydrochloride contained in the core is eluted. Examples of U.S. Pat. No. 8,182,851 describe that a lysine hydrochloride concentration is 20%.

SUMMARY OF THE INVENTION

The aforementioned prior art references disclose that lecithin, vegetable oil, fatty acid and the like are used as liquefiable conditioners, modifying agents or dissolution control agents. While an influence of these components on the rumen protection is referred to in the Examples, an influence on the dissolution in the intestines after rumen passage is not disclosed.

Accordingly, it is one object of the present invention to provide novel feed additive compositions for ruminants containing not less than 30 wt % of a biologically active substance, which are of a dispersion type with less degradation of property due to chewing at feeding time, show high protection in the rumen, and are also superior in dissolution in the gastrointestinal tract.

This and other objects, which will become apparent during the following detailed description, have been achieved by the inventors' discovery that dissolution in the gastrointestinal tract can be enhanced, while maintaining high protection in the rumen, by using particular amounts of lecithin and natural vegetable oil.

Therefore, the present invention provides the following.

(1) A feed additive composition for ruminants, comprising (A) at least one member selected from the group consisting of hydrogenated vegetable oil and hydrogenated animal oil each having a melting point of higher than 50° C. and lower than 90° C.;

(B) not less than 0.05 wt % and not more than 6 wt % of lecithin;

(C) not less than 30 wt % and less than 65 wt % of a biologically active substance;

(D) not less than 0.01 wt % and less than 0.8 wt % of a natural vegetable oil; and not less than 0.1 wt % and less than 6 wt % of water.

(2) The composition of (1), wherein the aforementioned (D) is not less than 0.1 wt % and not more than 0.4 wt % of a natural vegetable oil.

(3) The composition of (1) or (2), wherein the aforementioned natural vegetable oil is at least one member selected from the group consisting of soybean oil, palm oil, rape seed oil, canola oil, olive oil, almond oil, avocado oil, and safflower oil.

(4) The composition of any one of (1) to (3), wherein the aforementioned natural vegetable oil comprises an unsaturated fatty acid having a carbon atom number of 18 in not less than 60 wt % and not more than 95 wt % relative to the constituent fatty acid of the natural vegetable oil.

(5) The composition of any one of (1) to (4), wherein the aforementioned natural vegetable oil comprises oleic acid in not less than 55 wt % and not more than 90 wt % relative to the constituent fatty acid of the natural vegetable oil.

(6) The composition of any one of (1) to (5), wherein the aforementioned natural vegetable oil is olive oil.

(7) The composition of any one of (1) to (6), wherein the aforementioned biologically active substance is at least one member selected from the group consisting of an amino acid, a vitamin and a vitamin-like substance.

(8) The composition of any one of (1) to (7), having, as a surface layer, a layer substantially free of a biologically active substance.

(9) The composition of (8), wherein the layer substantially free of a biologically active substance has a thickness of not less than 30 μm and not more than 110 μm.

Effect of the Invention

According to the present invention, a feed additive composition for ruminants that is provided with high protection in the rumen and is superior in dissolution in the gastrointestinal tract can be provided.

The feed additive compositions for ruminants of the present invention containing both lecithin and natural vegetable oil at particular concentrations can further promote dissolution in the gastrointestinal tract while maintaining high protection in the rumen as compared to when only one of lecithin and natural vegetable oil is contained.

According to the feed additive compositions for ruminants of the present invention, a large amount of a biologically active substance (e.g., amino acid etc.) can be efficiently transported up to the small intestine of lactating cow. Therefore, the lactating cow can absorb a large amount of the biologically active substance (e.g., amino acid etc.) as a nutrient, as a result of which, for example, it is possible to increase milk yield production and the like.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
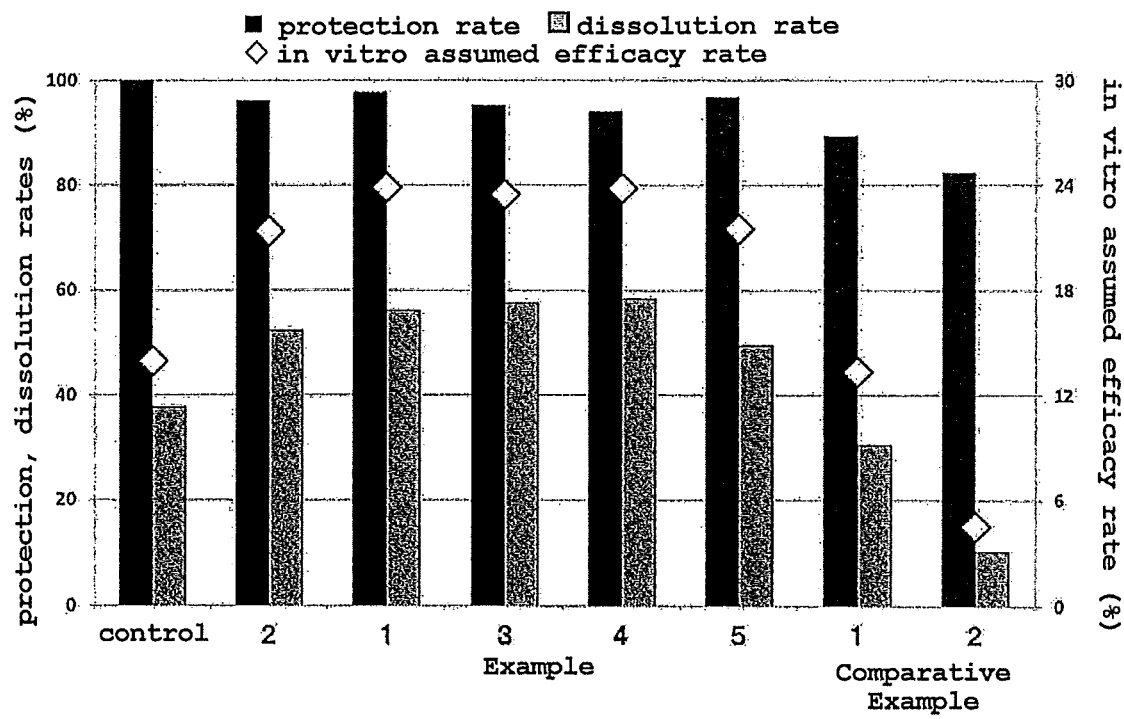
FIG. 1 is a graph showing the protection rate, dissolution rate and in vitro assumed efficacy rate of the compositions of Examples 1 to 5, Comparative Examples 1 and 2 and control. The left vertical axis shows the scale of the protection rate and the dissolution rate and the right vertical axis shows the scale of the in vitro assumed efficacy rate.

One of the characteristics of the feed additive composition for ruminants of the present invention (to be also referred to as "the composition of the present invention" in the following) is that it contains (A) at least one member selected from the group consisting of hydrogenated vegetable oil and hydrogenated animal oil each having a melting point of higher than 50° C. and lower than 90° C. (to be also referred to as "Component A" in the following), (B) lecithin (to be also referred to as "Component B" in the following), (C) a biologically active substance (to be also referred to as "Component C" in the following), (D) natural vegetable oil (to be also referred to as "Component D" in the following) and water.

In the present invention, the "feed additive composition for ruminants" generally refers to a composition added to a feed for ruminants and ingested when the ruminants ingest the feed. However, it may not necessarily be added to a feed as long as it is ingested by ruminants and, for example, the composition of the present invention may be ingested by itself by ruminants.

Component A

In the composition of the present invention, component A acts as a protector. Hydrogenated vegetable oil and hydrogenated animal oil used as Component A are obtained by solidifying a vegetable oil or animal oil that is liquid at ordinary temperature (25° C.) by adding hydrogen, and are a concept also including fully hydrogenated oil. The melting point of the hydrogenated vegetable oil and hydrogenated animal oil used in the present invention is generally higher than 50° C., and, since the protection in the rumen may be superior, preferably not less than 55° C., more preferably not less than 60° C. The melting point is generally lower than 90° C., and, since the dissolution in the gastrointestinal tract may be superior, preferably not more than 80° C., more preferably not more than 70° C. The melting point of the hydrogenated vegetable oil and hydrogenated animal oil used in the present invention is measured by the open-tube melting point measurement method defined in the Japan Agricultural Standards.

Specific examples of the hydrogenated vegetable oil include soybean hydrogenated oil, palm hydrogenated oil, rape seed hydrogenated oil, canola hydrogenated oil, olive hydrogenated oil, almond hydrogenated oil, avocado hydrogenated oil, peanut hydrogenated oil, cottonseed hydrogenated oil, corn hydrogenated oil, safflower hydrogenated oil, sunflower hydrogenated oil, safflower hydrogenated oil, rice hydrogenated oil, candelilla wax, carnauba wax, rice wax, Japan wax, beeswax and the like, preferably soybean hydrogenated oil or soybean fully hydrogenated oil since they are industrially easily available. Specific examples of the hydrogenated animal oil include beef tallow, lard, whale wax and the like, preferably beef tallow, lard since they are industrially easily available. These hydrogenated vegetable oil and hydrogenated animal oil may be used singly, or two or more kinds thereof may be used in combination.

The content of component A in the composition of the present invention generally exceeds 23 wt %, and, since the protection in the rumen may be superior, is preferably not less than 30 wt %, more preferably not less than 35 wt %, relative to the total weight of the composition of the present invention. The content is generally less than 60 wt %, and, since a high concentration of a biologically active substance can be contained, preferably not more than 55 wt %, more preferably not more than 50 wt %, relative to the total weight of the composition of the present invention.

Component B

Lecithin used as Component B is considered to act as an emulsifier, to modify the surface of the biologically active substance and uniformly disperse the active substance in the molten protector without unevenly distributing the substance.

Specific examples of lecithin include plant-derived lecithins such as soybean lecithin, rape lecithin, rapeseed lecithin, sunflower lecithin, safflower lecithin, cottonseed lecithin, corn lecithin, linseed lecithin, sesame lecithin, rice lecithin, coconut lecithin, palm lecithin and the like; egg-yolk lecithin and the like, preferably plant-derived lecithin, more preferably soybean lecithin, since they are industrially easily available. These lecithins may be, for example, hydrogenated product, enzyme treatment product, enzyme decomposition product, lecithin fractionated product or the like. These lecithins may be used singly, or two or more kinds thereof may be used in combination.

The content of Component B in the composition of the present invention is generally not less than 0.05 wt % and, since the protection in the rumen could be superior, preferably not less than 0.5 wt %, more preferably not less than 1 wt %, relative to the total weight of the composition of the present invention. The content is generally not more than 6 wt % and, since the protection in the rumen could be superior, preferably not more than 5 wt %, more preferably not more than 3 wt %, particularly preferably not more than 2 wt %, relative to the total weight of the composition of the present invention.

Component C

The biologically active substance used as Component C is not particularly limited as long as it is a substance capable of exhibiting a bioactive function in vivo when ingested by ruminants. For example, an amino acid, vitamin, vitamin-like substance, enzyme, protein, peptide and the like can be mentioned. From the aspect of probiotics, it is preferably an amino acid, vitamin or a vitamin-like substance.

The amino acid may be a free amino acid, or a physiologically acceptable salt. Examples of the physiologically acceptable salts of the amino acid include salts with inorganic bases, salts with inorganic acids and salts with organic acids and the like. Examples of the salt with an inorganic base include salts with alkali metals such as sodium, potassium, lithium and the like, salts with alkaline earth metals such as calcium, magnesium and the like, ammonium salt and the like. Examples of the salt with an inorganic acid include salts with hydrohalic acid (hydrochloric acid, hydrobromic acid, hydroiodic acid etc.), sulfuric acid, nitric acid, phosphoric acid and the like. Examples of the salt with an organic acid include salts with formic acid, acetic acid, propionic acid, oxalic acid, succinic acid, maleic acid, fumaric acid, citric acid and the like. Any of L-form, D-form and DL-form of the amino acid can be used, and preferred is the L-form or DL-form, and further preferred is the L-form.

Specific examples of amino acid include basic amino acids such as arginine, histidine, lysine, hydroxylysine, ornithine, citrulline and the like or a physiologically acceptable salt thereof; neutral amino acids such as glycine, alanine, valine, leucine, isoleucine, serine, threonine, asparagine, glutamine, tryptophan, 5-hydroxytryptophan, cystine, cysteine, methionine, proline, hydroxyproline, phenylalanine, tyrosine and the like or a physiologically acceptable salt thereof; and acidic amino acids such as aspartic acid, glutamic acid and the like or a physiologically acceptable salt thereof and the like. The amino acid is preferably a basic amino acid or a physiologically acceptable salt thereof since it shows high physiologically activating function on dairy cattle. Among others, the amino acid is more preferably lysine or a physiologically acceptable salt thereof, particularly preferably a salt of lysine with an inorganic acid, most preferably lysine hydrochloride, since it is considered to be most important for increasing the milk yield of lactating cow. These amino acids may be used alone, or two or more kinds thereof may be used in combination.

The amino acid and a physiologically acceptable salt thereof may be any of those obtained by extraction and purification from naturally occurring animals, plants and the like, or those obtained by chemical synthesis method, fermentation method, enzymatic method or gene recombination method may be used. Alternatively, a commercially available product may be used as it is or after pulverizing. When the amino acid is pulverized, the particle size thereof is preferably not more than 100 μm, more preferably not more than 75 μm.

Specific examples of vitamin include water-soluble vitamins such as vitamin $B_1$, vitamin $B_2$, vitamin $B_6$, vitamin $B_{12}$, folic acid, niacin, pantothenic acid, biotin, vitamin C and the like. These vitamins may be used alone, or two or more kinds thereof may be used in combination, and an appropriate one may be selected.

The vitamin-like substance refers to a compound having a physiological action similar to that of vitamin and is biosynthesizable in the body unlike vitamin. Concrete examples thereof include choline (e.g., choline chloride, CDP (cytidine diphosphate)choline, choline bitartrate etc.), p-aminobenzoic acid, lipoic acid, carnitine, orotic acid, ubiquinone and the like. These vitamin-like substances may be used alone, or two or more kinds thereof may be used in combination.

The content of component C in the composition of the present invention is generally not less than 30 wt % and, since a large amount of a biologically active substance can be efficiently afforded, preferably not less than 35 wt %, more preferably not less than 40 wt %, relative to the total weight of the composition of the present invention. The content is generally less than 65 wt % and, since protection in the rumen could be superior, preferably not more than 60 wt %, relative to the total weight of the composition of the present invention.

Component D

The natural vegetable oil used as component D refers to a vegetable oil which is liquid at ordinary temperature (25° C.), and is a concept distinguished from the hydrogenated vegetable oil possibly used for component A.

Specific examples of the natural vegetable oil include soybean oil, palm oil, rape seed oil, canola oil, olive oil, almond oil, avocado oil, safflower oil, sunflower oil, corn oil, rice oil and the like. Preferred are soybean oil, palm oil, rape seed oil, canola oil, olive oil, almond oil, avocado oil and safflower oil. These natural vegetable oils may be used alone, or two or more kinds thereof may be used in combination. These natural vegetable oils may be subjected to a treatment such as transesterification, partition treatment and the like as long as it is liquid at ordinary temperature.

While the kind of the fatty acid (constituent fatty acid) constituting Component D is not particularly limited, for example, saturated or unsaturated fatty acids having a carbon atom number of 12 to 24 such as lauric acid, myristic acid, palmitic acid, pulmitoleic acid, stearic acid, oleic acid, linoleic acid, linolenic acid, arachidic acid, behenic acid and the like can be mentioned. From the aspect of dissolution in the gastrointestinal tract, component D preferably includes unsaturated fatty acids having a carbon atom number of 18 such as oleic acid, linoleic acid, linolenic acid and the like.

While the constitution rate of saturated and unsaturated fatty acids in Component D is not particularly limited, component D preferably contains not less than 60 wt % and not more than 95 wt %, more preferably not less than 80 wt % and not more than 95 wt %, of unsaturated fatty acid having a carbon atom number of 18, relative to the constituent fatty acid of component D, since the in vitro assumed efficacy rate could be superior.

Component D preferably contains not less than 55 wt % and not more than 90 wt %, more preferably not less than 70 wt % and not more than 90 wt %, of oleic acid relative to the constituent fatty acid of Component D. Specific examples of component D containing not less than 55 wt % and not more than 90 wt % of oleic acid relative to the constituent fatty acid include olive oil and the like.

While the unsaturation rate of fatty acid having a carbon atom number of 18 contained in Component D (rate of weight of unsaturated fatty acid having a carbon atom number of 18 to the total weight of saturated fatty acid and unsaturated fatty acid having a carbon atom number of 18) is not particularly limited, it is generally not less than 40% and, since the in vitro assumed efficacy rate could be superior, preferably not less than 50%, more preferably not less than 55%. While the upper limit of the unsaturation rate is not particularly limited, it is generally 100%.

The content of Component D in the composition of the present invention is generally not less than 0.01 wt % and, since the in vitro assumed efficacy rate could be superior, preferably not less than 0.05 wt %, more preferably not less than 0.1 wt %, relative to the total weight of the composition of the present invention. The content is generally less than 0.8 wt % and, since the in vitro assumed efficacy rate could be superior, preferably not more than 0.6 wt %, more preferably not more than 0.4 wt %, particularly preferably less than 0.4 wt %, relative to the total weight of the composition of the present invention.

Water contained in the composition of the present invention is considered to affect the preservation stability of the composition of the present invention and improve protection in the rumen. Water contained in the composition of the present invention is not particularly limited as long as it is generally used for producing feed additive compositions and, for example, ultrapure water, pure water, ion exchange water, distilled water, purified water, tap water and the like can be mentioned.

The content of water (water content) in the composition of the present invention is generally not less than 0.1 wt % and, since the protection in the rumen could be superior, preferably not less than 2 wt %, relative to the total weight of the composition of the present invention. The content is generally less than 6 wt % and, since the protection in the rumen could be superior, preferably not more than 5 wt %, more preferably not more than 4 wt %, relative to the total weight of the composition of the present invention.

The water content of the composition of the present invention can be determined by measuring an amount of decrease after heating at 105° C. for 20 min by Kett moisture analyzer (infrared Moisture Balance FD-610).

The composition of the present invention may contain, besides Components A to D and water, other component other than those. Such other components are not particularly limited as long as the object of the present invention is not impaired. For example, excipients such as calcium carbonate, silicon dioxide and the like; lubricants such as magnesium stearate, calcium stearate, talc and the like; pH adjusters such as sodium hydrogen carbonate, citric acid and the like; anticaking agents such as calcium silicate, sodium aluminosilicate and the like; and the like can be mentioned. Such other component may be used singly, or two or more kinds thereof may be used in combination.

The composition of the present invention is preferably formed in a shape easily ingestable for ruminants. While the shape is not particularly limited, for example, spherical, granular, pellet shape, rugby ball shape, pressed barley shape, hen's egg shape and the like can be mentioned.

It is preferable that the composition of the present invention has a spherical or a shape similar thereto. While the particle size of a molded product of the composition of the present invention is not particularly limited, it is generally 0.1 to 20 mm and, from the aspect of mixing level with a feed, preferably 0.3 to 10 mm, more preferably 0.5 to 5 mm. The particle size of the composition of the present invention is defined by sieve analysis using the standard sieve defined in JIS Z 8801 of Japanese Industrial Standards, which is incorporated herein by reference in its entirety.

The production method of the composition of the present invention is not particularly limited, and the composition of the present invention may be produced by a method known per se. For example, it can be produced by the method described in WO2008/041371, US-A-2009/0232933, WO2009/122750, US-A-2011/0081444, which are incorporated herein by reference in their entireties, or a method analogous thereto. Specifically, the composition of the present invention can be produced by a method including solidifying a molten mixture containing Components A to D by immersing in water or the like.

A preparation method of the molten mixture containing Components A to D is not particularly limited and, for example, a method including heating Components A to D (optionally containing other component when desired) using a commercially available extruder (preferably, twin screw extruder) and the like, and the like can be mentioned. The order of addition of Components A to D to a cylinder of the extruder is not particularly limited. To coat the surface of Component C with Component B, the Components B and C may be mixed with a Nauta mixer or the like before addition, or Components A to D may be added almost simultaneously to increase production efficiency. Alternatively, the molten mixture can also be obtained by mixing Components A and C in advance at around room temperature, adding the remaining components and heating the mixture. Component C may be pulverized before use. For example, Component C may be used after pulverizing with a pulverizer to a particle size of preferably not more than 100 μm, more preferably not more than 75 μm, and sieving as necessary.

The temperature at which Components A to D are heated is not particularly limited as long as it is not less than the melting point of Component A. It is preferably 5 to 15° C. higher than the melting point of Component A. For example, when soybean fully hydrogenated oil (melting point: 67 to 71° C.) is used as Component A, it is heated at 80 to 85° C. In this case, the component other than Component A is not necessarily melted. For example, when L-lysine hydrochloride (melting point: 263° C.) is used as component C, L-lysine hydrochloride may be dispersed without melting and the molten mixture may be in a slurry state. It is not necessary to heat at a temperature not less than the melting point of Component A from the beginning of heating. A stable molten mixture is obtained efficiently by, for example, first preheating materials at a temperature 5 to 10° C. lower than the melting point of Component A, then conveying the materials by a screw in the cylinder of the extruder, and then heating them at a predetermined temperature not less than the melting point of Component A.

The instrument that can be utilized for preparing the molten mixture is not limited to the extruder, and any instrument may be used appropriately as long as it can prepare a molten mixture that can become a droplet when dropped naturally.

A method for immersing the molten mixture containing Components A to D in water is not particularly limited. For example, a method including retaining the molten mixture in a container having a hole (pore) with a predetermined diameter and dropping the molten mixture into water from the hole, and the like can be mentioned. When the molten mixture is dropped (preferably, free fall) from the hole with a predetermined diameter, it is cleaved by the action of surface tension during dropping to become respectively independent droplets. When the droplet is dropped into a water tank at a given temperature, the droplet is instantaneously cooled in water to solidification and a solid with a given shape is obtained. When the droplet solidifies into solid, the water in the water tank is taken into the solid. This water can be decreased by a heat-drying treatment (described later). When the molten mixture is immersed in water, a part of the biologically active substance may be dissolved in water; however, the amount thereof is extremely small.

The diameter of the hole in the container retaining the molten mixture may be appropriately selected according to the size of the finally-obtained solid (solidified droplet of the molten mixture). For example, when a solid with a particle size of about 3 to 5 mm is produced, the diameter of the hole only needs to be set to 0.5 to 3 mm, and when a solid with a particle size of about 5 to 10 mm is produced, the diameter of the hole only needs to be set to 3 to 5 mm. The diameter of the hole in the container for storing a molten mixture is generally 0.5 to 5 mm, preferably 1 to 4 mm.

While the container retaining the molten mixture is not particularly limited as long as it has a hole with a predetermined diameter, a multi-hole shooter is preferably used since it can efficiently increase the production amount. Here, the "multi-hole shooter" refers to a container having a plurality of perforations in the bottom and a facility for temporarily retaining the molten mixture. The container for retaining the molten mixture is preferably provided with a heat facility to prevent cooling of the molten mixture to be retained.

The drop distance (e.g., distance from the bottom surface of the multi-hole shooter to water surface) of the molten mixture is not particularly limited and it is generally 10 mm to 1.5 m, preferably 30 mm to 1.0 m. The shape of the finally-obtained solid can be changed by adjusting the drop distance of the molten mixture. For example, when a molten mixture heated to about 65° C. is dropped into water, a drop distance of 50 to 150 mm affords a solid with a spherical shape to a rugby ball-like shape. A longer drop distance leads to a large impact energy with the water surface, and a solid with a shape of flattened pressed barley is obtained. For example, when the drop distance is about 0.5 m, a solid with a shape of pressed barley with an undulating fringe is obtained.

The temperature of the molten mixture when dropped into water is not particularly limited and is generally 60 to 90° C., and preferably 70 to 90° C. in view of the melting point of component A and the like.

The temperature of the water into which the molten mixture is dropped is not particularly limited as long as the molten mixture is instantaneously solidified, and is generally 0 to 30° C. When the temperature of water into which the molten mixture is dropped is too high, the particle shape of the obtained solid tends to collapse, turn into a flake and break easily. The water temperature is preferably maintained constant. For example, the temperature of water into which the molten mixture is dropped can be maintained constant by continuous supplementation of water at a predetermined temperature and the like.

A method for collecting a mixture solidified in water is not particularly limited. When the water temperature is to be maintained constant by continuously supplementing water, the solidified mixture (specific gravity: about 1.1) may be collected using a net, a net container or the like.

When the composition of the present invention is produced by a method including solidifying a molten mixture containing Components A to D by immersing in water, the method preferably further includes applying a heat-drying treatment to the solidified mixture. The water content of the composition of the present invention can be controlled by the heat-drying treatment. The heat-drying treatment can be performed, for example, by exposing the solidified mixture generally for several minutes to several tens of minutes to an atmosphere (e.g., hot water, vapor, hot air etc.) set to a temperature lower than the melting point of Component A contained in the solidified mixture, or the like. The time of the heat-drying treatment can be appropriately determined based on the temperature of the heat-drying treatment, the kind of Component A, the amount of the solidified mixture and the like. For example, the solidified mixture may be exposed for a long time (e.g., 0.5 to 2 hr etc.) to an atmosphere set to a temperature lower than the melting point of Component A contained in the solidified mixture.

The composition of the present invention preferably has a layer substantially free of a biologically active substance as the surface layer thereof. The composition of the present invention may have water-repellency by the presence of a layer substantially free of a biologically active substance as the surface layer. As used herein, the "layer substantially free of a biologically active substance" means either a layer completely free of a biologically active substance or a layer containing a biologically active substance in an amount not inhibiting water-repellency (generally not more than 2 wt %, preferably not more than 1 wt %).

The thickness of the layer substantially free of a biologically active substance is generally not less than 30 μm and not more than 110 μm and, since water-repellency could be superior, preferably not less than 30 μm and not more than 80 μm.

The composition of the present invention having a layer substantially free of a biologically active substance as the surface layer can be produced by, for example, the aforementioned production method, that is, a method including solidifying a molten mixture containing Components A to D by immersing in water and subjecting the solidified mixture to a heat-drying treatment or the like. The layer substantially free of a biologically active substance is considered to be formed because the biologically active substance on the surface is dissolved in water when the molten mixture is immersed in water and then the surface of the solidified mixture is smoothened by the heat treatment.

The protection in the rumen and dissolution in the gastrointestinal tract of the composition of the present invention can be evaluated by the following method.

In the following method, the concentration of the biologically active substance in the test solution is measured by liquid chromatography (manufactured by Hitachi). When the biologically active substance is lysine, it can also be measured by a biosensor (manufactured by Oji Scientific Instruments).

Measurement of Concentration (Concentration A) of Biologically Active Substance for Calculation of Protection Rate Using a dissolution tester (manufactured by TOYAMA SANGYO CO., LTD.), a preparation sample (about 3 g) is placed in ultrapure water (900 ml) (produced using Milli Q (manufactured by Millipore)) heated to a temperature (e.g., 39° C.) corresponding to the body temperature of ruminants (e.g., dairy cattle etc.), and the mixture is stirred at 100 rpm. At 20 hr from the start of stirring, 2 ml of the stirring test solution is collected for protection rate measurement, and the concentration of the biologically active substance is measured (concentration A, unit: mg/dl).

Measurement of Concentration (Concentration B) of Biologically Active Substance for Calculation of Dissolution Rate To the test solution immediately after collection of the above-mentioned sample for protection rate measurement is added with stirring at 100 rpm an aqueous solution (8 ml) of a bile powder (manufactured by Wako Pure Chemical Industries, Ltd.) and pancreatin (manufactured by Wako Pure Chemical Industries, Ltd.) (concentration of bile powder and pancreatin is 23.4 g/100 ml for each) to give a small intestine-corresponding test solution. At 5 hr from the addition of the aqueous solution, 2 ml of the stirring test solution is collected for dissolution rate measurement, and the concentration of the biologically active substance is measured (concentration B, unit: mg/dl).

Calculation of Protection Rate and Dissolution Rate of Biologically Active Substance The protection rate and dissolution rate of biologically active substance are calculated by the following formulas.

$$\text{protection rate}[\%]=\{1-(\text{concentration } A[\text{mg/dl}]\times 9.08)/(\text{preparation sample weight}[g]\times 1000\times \text{content of biologically active substance in preparation sample }[\text{wt \%}]/100)\}\times 100$$

$$\text{dissolution rate}[\%]=\{((\text{concentration } B[\text{mg/dl}]-\text{concentration } A[\text{mg/dl}])\times 9.02)/(\text{preparation sample weight}[g]\times 1000\times \text{content of biologically active substance in preparation sample }[\text{wt \%}]/100)\}\times 100$$

The in vitro assumed efficacy rate of the composition of the present invention can be calculated from the following formula.

$$\text{in vitro assumed efficacy rate}[\%]=(\text{dissolution rate }[\%])\times(\text{content}[\text{wt \%}]\text{ of biologically active substance})/100$$

The ruminants for which the composition of the present invention is used are not particularly limited. For example, bovine, sheep, goat, deer, giraffe, camel and llama and the like can be mentioned. Preferred is bovine.

The amount of the composition of the present invention to be added to a feed for ruminants is not particularly limited, and can be appropriately adjusted according to the necessary amount of the biologically active substance and the like. The composition of the present invention is generally added to a feed and used together with the feed to be ingested by the ruminants. However, as long as the composition is ingested by the ruminants, it may not necessarily be added to a feed. For example, the composition of the present invention can be ingested by itself the ruminants.

Other features of the invention will become apparent in the course of the following descriptions of exemplary embodiments which are given for illustration of the invention and are not intended to be limiting thereof.

EXAMPLES

Experimental Example 1. Study of Content of Natural Vegetable Oil

Example 1

Soybean fully hydrogenated oil (manufactured by Yokozeki Oil & Fat Industries Co., Ltd., melting point: 67° C.), soybean lecithin (manufactured by ADM, Yelkin TS), L-lysine hydrochloride (manufactured by Ajinomoto Co., Inc.) and olive oil (manufactured by JOM, extra virgin) in the proportions shown in the following Table 1 were continuously cast into a twin screw extruder (manufactured by Cosmotec Co., Ltd.).

Thereafter, the mixture was heated (preheating temperature: 65° C., main heating temperature: 85° C., set temperature for outlet: 70° C.), melted and mixed in a cylinder to give a molten mixture in a molten slurry state. The obtained molten mixture was discharged from the outlet of the extruder, cast into a multi-hole shooter (number of holes: 2060, hole diameter: 2 mm), and the molten mixture was freely dropped from the hole of a multi-hole shooter into the water tank for cooling (water temperature: 5 to 15° C.). The distance from the multi-hole shooter to the water surface of the water tank for cooling was 10 cm. The molten mixture that dropped from the multi-hole shooter became droplet during dropping, immersed in water, cooled and solidified instantaneously. The attached water was dehydrated by blowing at room temperature, and the solid was subjected to a heat-drying treatment by a fluidized-bed dryer (manufactured by Ajinomoto Co., Inc.) set to 52° C. for 7 min to give granules (feed additive composition for ruminants). In the following, the granulated product is referred to as the composition of Example 1.

Examples 2-5, Comparative Examples 1 and 2, and Control

In the same manner as in Example 1 except that soybean fully hydrogenated oil (manufactured by Yokozeki Oil & Fat Industries Co., Ltd., melting point:67° C.), soybean lecithin (manufactured by ADM, Yelkin TS), L-lysine hydrochloride (manufactured by Ajinomoto Co., Inc.) and olive oil (manufactured by JOM, extra virgin) were cast in the proportions shown in the following Table 1, feed additive compositions for ruminants of Examples 2 to 5, Comparative Examples 1 and 2, and the control (hereinafter to be referred to as composition of Examples 2 to 5, Comparative Examples 1 and 2, and the control).

The lysine content, water content, protection rate and dissolution rate shown in Examples 1 to 5, Comparative Examples 1 and 2, and the control were measured in the following manner.

Measurement of Lysine Content of Feed Additive Composition

The lysine content of each composition was measured using a biosensor (manufactured by Oji Scientific Instruments).

Measurement of Water Content of Feed Additive Composition

The water content of each composition was determined by measuring, by Kett moisture analyzer (infrared Moisture Balance FD-610), an amount of decrease after heating at 105° C. for 20 min.

Measurement of Protection Rate and Dissolution Rate

The concentration of the biologically active substance in the following test solutions was measured using a biosensor (manufactured by Oji Scientific Instruments).

Measurement of Concentration (Concentration A) of Biologically Active Substance (L-Lysine) for Calculation of Protection Rate Using a dissolution tester (manufactured by TOYAMA SANGYO CO., LTD.), a preparation sample (about 3 g) was placed in ultrapure water (produced using Milli Q (manufactured by Millipore)) (900 ml) heated to 39° C. corresponding to the body temperature of dairy cattle, and the mixture was stirred at 100 rpm. At 20 hr from the start of stirring, 2 ml of the stirring test solution was collected for protection rate measurement, and the concentration of the biologically active substance (L-lysine) was measured (concentration A, unit: mg/dl).

Measurement of Concentration (Concentration B) of Biologically Active Substance (L-Lysine) for Calculation of Dissolution Rate To the test solution immediately after collection of the above-mentioned sample for protection rate measurement was added with stirring at 100 rpm an aqueous solution (8 ml) of a bile powder (manufactured by Wako Pure Chemical Industries, Ltd.) and pancreatin (manufactured by Wako Pure Chemical Industries, Ltd.) (concentration of bile powder and pancreatin is 23.4 g/100 ml for each) to give a small intestine-corresponding test solution. At 5 hr from the addition of the aqueous solution, 2 ml of the stirring test solution was collected for dissolution rate measurement, and the concentration of the biologically active substance (L-lysine) was measured (concentration B, unit: mg/dl).

Calculation of Protection Rate and Dissolution Rate of Biologically Active Substance (L-Lysine)

The protection rate and dissolution rate of biologically active substance (L-lysine) were calculated by the following formulas.

$$\text{protection rate}(\%) = \{1 - (\text{concentration } A[\text{mg/dl}] \times 9.08)/(\text{preparation sample weight}[g] \times 1000 \times \text{content of biologically active substance in preparation sample } [\text{wt \%}]/100)\} \times 100$$

$$\text{dissolution rate}(\%) = \{((\text{concentration } B[\text{mg/dl}] - \text{concentration } A\ [\text{mg/dl}]) \times 9.02)/(\text{preparation sample weight}[g] \times 1000 \times \text{content of biologically active substance in preparation sample } [\text{wt \%}]/100)\} \times 100$$

The in vitro assumed efficacy rates of the compositions of Examples 1 to 5, Comparative Examples 1 and 2, and the control were calculated from the following formula.

$$\text{in vitro assumed efficacy rate}[\%] = (\text{dissolution rate } [\%]) \times (\text{content}[\text{wt \%}] \text{ of biologically active substance})/100$$

The L-lysine content, water content, protection rate, dissolution rate and in vitro assumed efficacy rate of the compositions of Examples 1 to 5, Comparative Examples 1 and 2, and the control are shown in the following Table 1. In addition, the protection rate, dissolution rate and in vitro assumed efficacy rate of the compositions of Examples 1 to 5, Comparative Examples 1 and 2, and the control are shown in FIG. 1.

The contents of soybean fully hydrogenated oil, soybean lecithin and olive oil in the molten mixture do not change before and after granulation in water.

TABLE 1

|  |  | blending proportion [wt %] | | | L-lysine content [wt %] of feed additive composition | water content [wt %] of feed additive composition | protection rate [%] | dissolution rate [%] | in vitro assumed efficacy rate [%] |
|---|---|---|---|---|---|---|---|---|---|
|  |  | (A) soybean fully hydrogenated oil | (B) soybean lecithin | (C) L-lysine hydrochloride | (D) olive oil |  |  |  |  |  |
| control |  | 41.9 | 1.1 | 57 | — | 37.0 | 4.5 | 100 | 37.7 | 13.9 |
| Ex. | 1 | 41.7 | 1.1 | 57 | 0.2 | 42.5 | 2.1 | 97.6 | 56.2 | 23.9 |
|  | 2 | 43.9 | 1.1 | 54.9 | 0.1 | 40.9 | 2.1 | 96.2 | 52.4 | 21.4 |
|  | 3 | 43.7 | 1.1 | 54.9 | 0.3 | 40.7 | 1.8 | 95.3 | 57.6 | 23.4 |
|  | 4 | 42.6 | 1.1 | 56 | 0.3 | 42.8 | 4.9 | 94.1 | 58.4 | 25.0 |
|  | 5 | 41.5 | 1.1 | 57 | 0.4 | 43.5 | 3.7 | 96.7 | 49.4 | 21.5 |
| Comp. Ex. | 1 | 41.1 | 1.1 | 57 | 0.8 | 43.7 | 2.3 | 89.4 | 30.5 | 13.3 |
|  | 2 | 40.7 | 1.1 | 57 | 1.2 | 44.1 | 2.0 | 82.4 | 10.2 | 4.5 |

As is clear from the results shown in Table 1 and FIG. 1, the compositions of the present invention (Examples 1 to 5) had high protection and were also superior in dissolution.

On the other hand, the compositions of Comparative Examples 1 and 2 showed low protection rate and low dissolution rate and were poor in in vitro assumed efficacy rate compared to the control composition.

Experimental Example 2. Study of Kind of Natural Vegetable Oil

Example 6

Soybean fully hydrogenated oil (manufactured by Yokozeki Oil & Fat Industries Co., Ltd., melting point: 67° C.), soybean lecithin (manufactured by ADM, Yelkin TS), L-lysine hydrochloride (manufactured by Ajinomoto Co., Inc.) and olive oil (manufactured by JOM, extra virgin) in the proportions shown in the following Table 3-1 were continuously cast into a twin screw extruder (manufactured by Cosmotec Co., Ltd.).

Thereafter, the mixture was heated (preheating temperature: 65° C., main heating temperature: 85° C., set temperature for outlet: 70° C.), melted and mixed in a cylinder to give a molten mixture in a molten slurry state. The obtained molten mixture was discharged from the outlet of the extruder, cast into a multi-hole shooter (number of holes: 2060, hole diameter: 2 mm), and the molten mixture was freely dropped from the hole of a multi-hole shooter into the water tank for cooling (water temperature: 5 to 15° C.). The distance from the multi-hole shooter to the water surface of the water tank for cooling was 10 cm. The molten mixture that dropped from the multi-hole shooter became droplet during dropping, immersed in water, cooled and solidified instantaneously. The attached water was dehydrated by blowing at room temperature, and the solid was subjected to a heat-drying treatment by a fluidized-bed dryer (manufactured by Ajinomoto Co., Inc.) set to 52° C. for 7 min to give granules (feed additive composition for ruminants). In the following, the granulated product is referred to as the composition of Example 6.

Examples 7 to 12, and the Control

In the same manner as in Example 6 except that soybean oil (manufactured by Wako Pure Chemical Industries, Ltd.), rape seed oil (manufactured by Kaneda aburaten), avocado oil (manufactured by Kaneda aburaten), almond oil (manufactured by Kaneda aburaten), palm oil (manufactured by Kaneda aburaten) and safflower oil (manufactured by J-OIL MILLS, Inc.) in the proportions shown in the following Table 3-1 were used instead of olive oil, the feed additive compositions for ruminants of Examples 7 to 11 were respectively obtained (hereinafter to be respectively referred to as compositions of Examples 7 to 11).

In the same manner as in Example 6 except that the proportions shown in the following Table 3-1 were used without using a natural vegetable oil such as olive oil and the like, the control feed additive composition for ruminants was obtained (hereinafter to be referred to as the control composition).

The (i) content rate of unsaturated fatty acid having a carbon atom number of 18 to constituent fatty acid, (ii) content rate of oleic acid to constituent fatty acid, and (iii) unsaturation rate of fatty acid having a carbon atom number of 18 of olive oil, soybean oil, rape seed oil, avocado oil, almond oil, palm oil and safflower oil used for preparing the compositions of Examples 6 to 12 are shown in the following Table 2.

TABLE 2

|  | Example 6 olive oil | Example 7 soybean oil | Example 8 rape seed oil | Example 9 avocado oil | Example 10 almond oil | Example 11 palm oil | Example 12 safflower oil |
|---|---|---|---|---|---|---|---|
| (i) content rate (wt %) of | 82.0 | 83.9 | 83.3 | 69.2 | 91.5 | 49.5 | 91.8 |

TABLE 2-continued

|  | Example 6 olive oil | Example 7 soybean oil | Example 8 rape seed oil | Example 9 avocado oil | Example 10 almond oil | Example 11 palm oil | Example 12 safflower oil |
|---|---|---|---|---|---|---|---|
| unsaturated fatty acid having carbon atom number of 18 to constituent fatty acid |  |  |  |  |  |  |  |
| (ii) content rate (wt %) of oleic acid to constituent fatty acid | 72.8 | 25.7 | 58.0 | 55.8 | 65.6 | 39.6 | 78.0 |
| (iii) unsaturation rate (%) of fatty acid having carbon atom number of 18 | 97.4 | 95.4 | 98.0 | 99.3 | 98.5 | 92.0 | 100 |

The L-lysine content, water content, protection rate and dissolution rate of the compositions of Examples 6 to 12 and the control were measured in the same manner as in Experimental Example 1. In addition, the in vitro assumed efficacy rate of the compositions of Examples 6 to 12 and the control was calculated similarly to Experimental Example 1.

Figure 2:
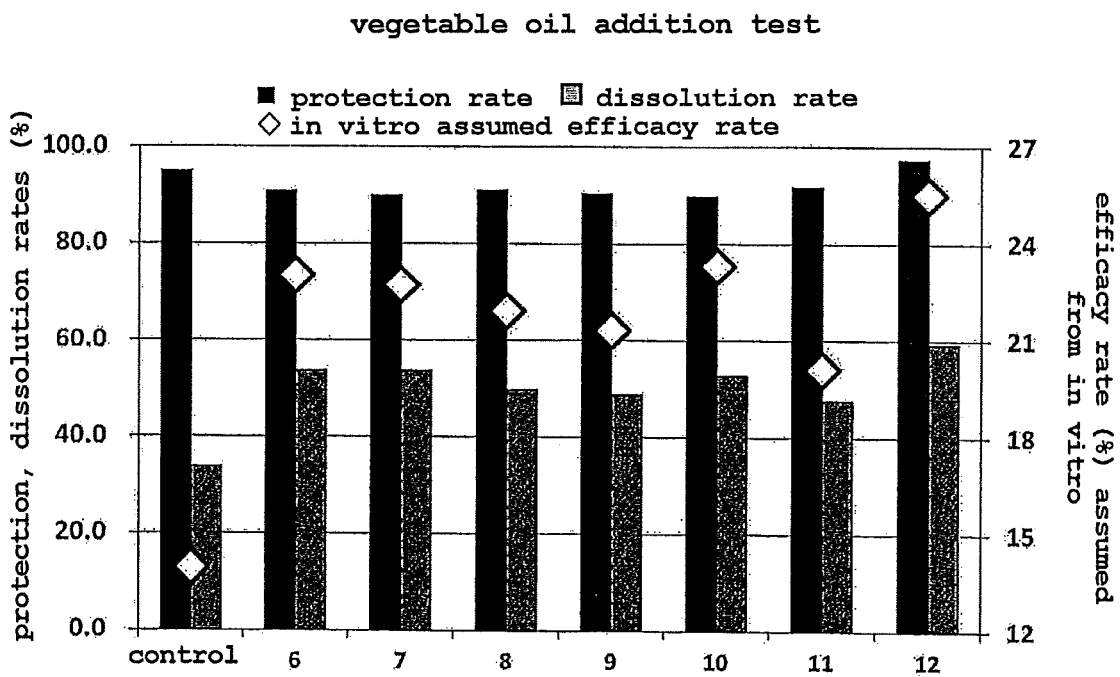
FIG. 2 is a graph showing the protection rate, dissolution rate and in vitro assumed efficacy rate of the compositions of Examples 6 to 12 and control. The left vertical axis shows the scale of the protection rate and the dissolution rate and the right vertical axis shows the scale of the in vitro assumed efficacy rate.

The L-lysine content, water content, protection rate, dissolution rate and in vitro assumed efficacy rate of the compositions of Examples 6 to 12 and the control are shown in the following Table 3-2. In addition, the protection rate, dissolution rate and in vitro assumed efficacy rate of the compositions of Examples 6 to 12 and the control are shown in FIG. 2.

oil) (Examples 7 to 12), similar to the use of olive oil (Example 6).

Experimental Example 3. Study of Relationship Between Unsaturation Rate of Fatty Acid Having a Carbon Atom Number of 18 and In Vitro Assumed Efficacy Rate Reference Example In the same manner as in Example 6 except that fully hydrogenated soybean oil (manufactured by Yokozeki Oil & Fat Industries Co., Ltd., unsaturation rate of fatty acid having a carbon atom number of 18=0%) was used instead of olive oil, a feed additive composition for ruminants of Reference Example (hereinafter to be referred to as the composition of Reference Example) was obtained.

TABLE 3-1

|  | blending proportion [wt %] | | | | | | | | | |
|---|---|---|---|---|---|---|---|---|---|---|
|  | (A) soybean fully hydrogenated oil | (B) soybean lecithin | (C) L-lysine hydrochloride | (D) olive oil | (D) soybean oil | (D) rape seed oil | (D) avocado oil | (D) almond oil | (D) palm oil | (D) safflower oil |
| control | 41.9 | 1.1 | 57 | — | — | — | — | — | — | — |
| Ex. 6 | 41.7 | 1.1 | 57 | 0.2 | — | — | — | — | — | — |
| 7 | 41.7 | 1.1 | 57 | — | 0.2 | — | — | — | — | — |
| 8 | 41.7 | 1.1 | 57 | — | — | 0.2 | — | — | — | — |
| 9 | 41.7 | 1.1 | 57 | — | — | — | 0.2 | — | — | — |
| 10 | 41.7 | 1.1 | 57 | — | — | — | — | 0.2 | — | — |
| 11 | 41.7 | 1.1 | 57 | — | — | — | — | — | 0.2 | — |
| 12 | 41.7 | 1.1 | 57 | — | — | — | — | — | — | 0.2 |

TABLE 3-2

|  | L-lysine content [wt %] of feed additive composition | water content [wt %] of feed additive composition | protection rate [%] | dissolution rate [%] | in vitro assumed efficacy rate [%] |
|---|---|---|---|---|---|
| control | 41.4 | 4.48 | 95.0 | 33.7 | 14.0 |
| Ex. 6 | 43.3 | 3.83 | 90.8 | 53.7 | 23.3 |
| 7 | 42.4 | 3.63 | 89.9 | 53.6 | 22.7 |
| 8 | 44.0 | 3.85 | 91.1 | 49.7 | 21.9 |
| 9 | 43.6 | 3.69 | 90.3 | 48.7 | 21.3 |
| 10 | 44.2 | 3.86 | 89.7 | 52.7 | 23.3 |
| 11 | 43.0 | 3.67 | 91.8 | 47.6 | 20.5 |
| 12 | 43.1 | 4.61 | 97.3 | 59.2 | 25.5 |

As is clear from the results shown in Table 3-2 and FIG. 2, the compositions of the present invention had high protection and were also superior in dissolution when soybean oil, rape seed oil, avocado oil, almond oil, palm oil or safflower oil was used as Component D (natural vegetable The protection rate and dissolution rate of the composition of Reference Example were measured in the same manner as in Experimental Example 1, and the in vitro assumed efficacy rate was calculated similarly to Experimental Example 1.

Figure 3:
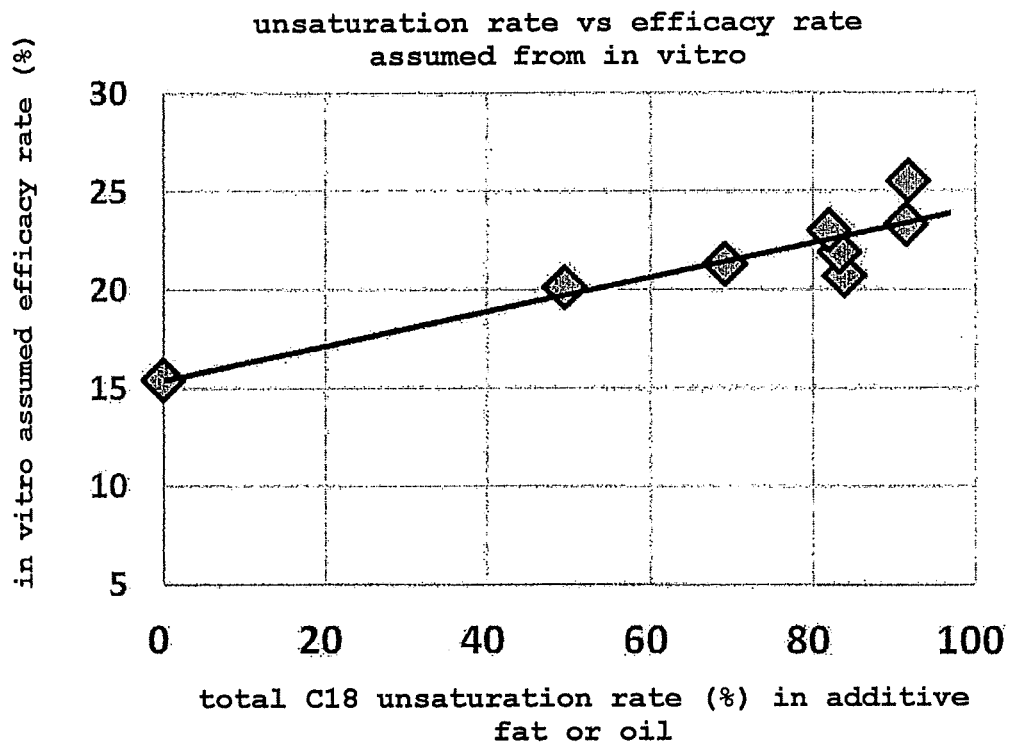
FIG. 3 is a graph plotting in vitro assumed efficacy rates of the compositions of Examples 6 to 12 and Reference Example relative to the unsaturation rate of a fatty acid having a carbon atom number of 18.

A graph plotting the in vitro assumed efficacy rate of the compositions of Examples 6 to 12 and Reference Example relative to the unsaturation rate of fatty acid having a carbon atom number of 18 is shown in FIG. 3.

From the results shown in FIG. 3, it was confirmed that the unsaturation rate and in vitro assumed efficacy rate of the fatty acid having a carbon atom number of 18 in Component D (natural vegetable oil) are correlated, and as the unsaturation rate of fatty acid having a carbon atom number of 18 increases, in vitro assumed efficacy rate tends to increase.

Figure 4:
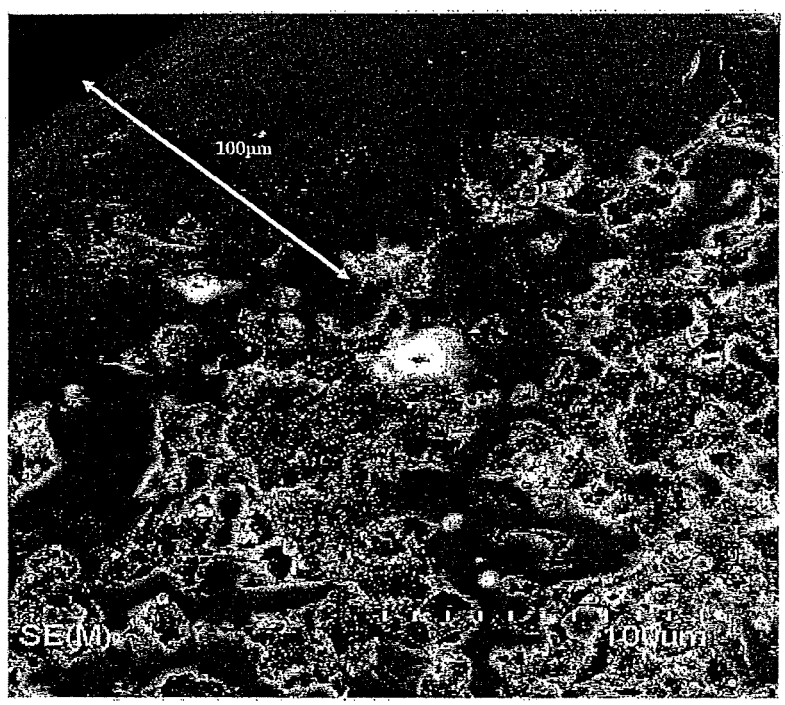
FIG. 4 is an SEM photograph showing a layer of the composition of Example 1, which is substantially free of a biologically active substance.

Experimental Example 4. Confirmation of Layer Substantially Free of Biologically Active Substance The composition of Example 1 obtained in Experimental Example 1 was cut and the section thereof was photographed with a scanning electron microscope (SEM). FIG. 4 shows an SEM photograph of the vicinity of the surface of the composition of Example 1. From the photograph, it was confirmed that a layer smoothened by the heat treatment (layer substantially free of a biologically active substance) was formed to a depth of 100 μm from the surface.

Experimental Example 5. Confirmation of Effect when Biologically Active Substance is Histidine Hydrochloride

Example 13 and Control

In the same manner as in Example 1 except that soybean fully hydrogenated oil (manufactured by Yokozeki Oil & Fat Industries Co., Ltd., melting point:67° C.), soybean lecithin (manufactured by ADM, Yelkin TS), L-histidine hydrochloride (manufactured by Ajinomoto Co., Inc.) and olive oil (manufactured by JOM, extra virgin) were cast in the proportions shown in the following Table 4, feed additive compositions for ruminants of Example 13 and control were obtained (hereinafter to be referred to as composition of Example 13 and control).

Measurement of L-Histidine Content of Feed Additive Composition

The L-histidine content of each composition was measured using liquid chromatography (manufactured by Hitachi).

The water content, protection rate and dissolution rate of the compositions of Example 13 and control were measured in the same manner as in Experimental Example 1. In the measurement of protection rate and dissolution rate, the concentration of the biologically active substance (L-histidine) in the test solution was measured using liquid chromatography (manufactured by Hitachi). In addition, the in vitro assumed efficacy rate of the compositions of Example 13 and control was calculated similarly to Experimental Example 1.

Figure 5:
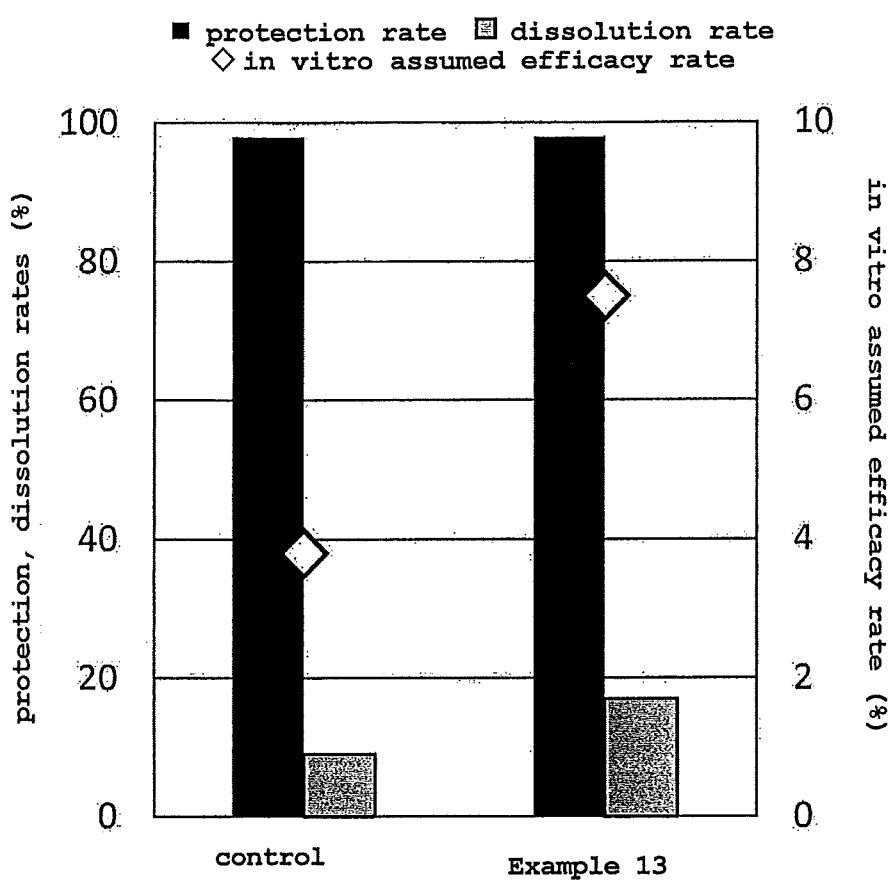
FIG. 5 is a graph showing the protection rate, dissolution rate and in vitro assumed efficacy rate of the compositions of Example 13 and control. The left vertical axis shows the scale of the protection rate and the dissolution rate and the right vertical axis shows the scale of the in vitro assumed efficacy rate.

The L-histidine content, water content, protection rate, dissolution rate and in vitro assumed efficacy rate of the compositions of Example 13 and control are shown in the following Table 4. In addition, the protection rate, dissolution rate and in vitro assumed efficacy rate of the compositions of Example 13 and control are shown in FIG. 5.

TABLE 4

| | blending proportion [wt %] | | | | L-histidine content [wt %] of feed additive composition | water content [wt %] of feed additive composition | protection rate [%] | dissolution rate [%] | in vitro assumed efficacy rate [%] |
|---|---|---|---|---|---|---|---|---|---|
| | (A) soybean fully hydrogenated oil | (B) soybean lecithin | (C) L-histidine hydrochloride | (D) olive oil | | | | | |
| control | 38.7 | 1.3 | 60.0 | 0 | 42.5 | 0.34 | 98 | 9 | 3.8 |
| Example 13 | 38.5 | 1.3 | 60.0 | 0.2 | 44.2 | 0.32 | 98 | 17 | 7.5 |

As is clear from the results shown in Table 4, the composition of the present invention (Example 13) had high protection and was superior in dissolution.

On the other hand, the composition of the control showed low protection rate and low dissolution rate.

Experimental Example 6. Confirmation of Effect when Biologically Active Substance is Arginine

Examples 14 and 15 and Control

In the same manner as in Example 1 except that soybean fully hydrogenated oil (manufactured by Yokozeki Oil & Fat Industries Co., Ltd., melting point:67° C.), soybean lecithin (manufactured by ADM, Yelkin TS), L-arginine (manufactured by Ajinomoto Co., Inc.) and olive oil (manufactured by JOM, extra virgin) were cast in the proportions shown in the following Table 5, feed additive compositions for ruminants of Examples 14 and 15 and the control were obtained (hereinafter to be referred to as composition of Examples 14 and 15 and control).

Measurement of L-Arginine Content of Feed Additive Composition

The L-arginine content of each composition was measured using liquid chromatography (manufactured by Hitachi).

The water content, protection rate and dissolution rate of the compositions of Examples 14 and 15 and the control were measured in the same manner as in Experimental Example 1. In addition, the in vitro assumed efficacy rates of the compositions of Examples 14 and 15 and the control were calculated similarly to Experimental Example 1.

Figure 6:
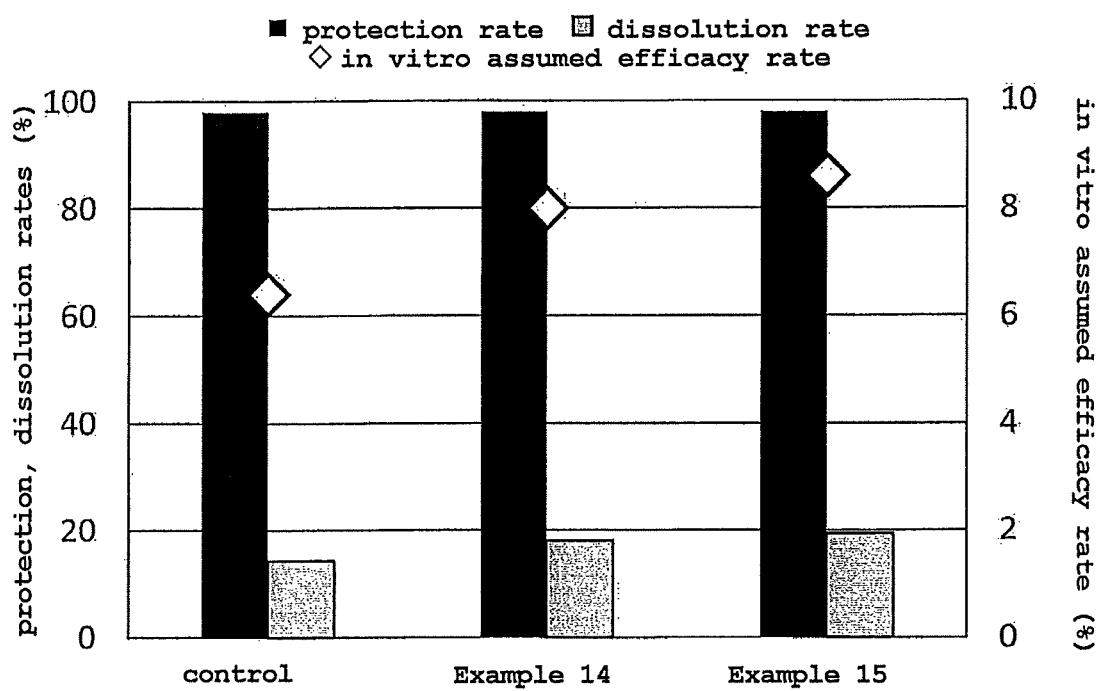
FIG. 6 is a graph showing the protection rate, dissolution rate and in vitro assumed efficacy rate of the compositions of Examples 14, 15 and control. The left vertical axis shows the scale of the protection rate and the dissolution rate and the right vertical axis shows the scale of the in vitro assumed efficacy rate.

The L-arginine content, water content, protection rate, dissolution rate and in vitro assumed efficacy rate of the compositions of Examples 14 and 15 and the control are shown in the following Table 5. In the measurement of protection rate and dissolution rate, the concentration of the biologically active substance (L-arginine) in the test solution was measured using liquid chromatography (manufactured by Hitachi). In addition, the protection rate, dissolution rate and in vitro assumed efficacy rate of the compositions of Examples 14 and 15 and the control are shown in FIG. 6.

TABLE 5

| | blending proportion [wt %] | | | | L-arginine content [wt %] of feed additive composition | water content [wt %] of feed additive composition | protection rate [%] | dissolution rate [%] | in vitro assumed efficacy rate [%] |
|---|---|---|---|---|---|---|---|---|---|
| | (A) soybean fully hydrogenated oil | (B) soybean lecithin | (C) L-arginine | (D) olive oil | | | | | |
| control | 50.7 | 1.3 | 48 | 0 | 44.9 | 1.7 | 98 | 14.2 | 6.4 |
| Example 14 | 50.4 | 1.44 | 47.9 | 0.2 | 44.7 | 1.9 | 98 | 18.0 | 8.0 |
| Example 15 | 50.3 | 1.33 | 48 | 0.37 | 44.5 | 2.0 | 98 | 19.3 | 8.6 |

As is clear from the results shown in Table 5, the compositions of the present invention (Examples 14 and 15) had high protection and were superior in dissolution.

On the other hand, the composition of the control showed low in vitro assumed efficacy rate and low dissolution rate.

INDUSTRIAL APPLICABILITY

According to the present invention, a feed additive composition for ruminants that is provided with high protection in the rumen and is superior in dissolution in the gastrointestinal tract can be provided.

The feed additive composition for ruminants of the present invention containing both lecithin and natural vegetable oil at particular concentrations can further promote dissolution in the gastrointestinal tract while maintaining high protection in the rumen as compared to when only one of lecithin and natural vegetable oil is contained.

According to the feed additive composition for ruminants of the present invention, a large amount of a biologically active substance (e.g., amino acid etc.) can be efficiently transported up to the small intestine of lactating cow. Therefore, the lactating cow can absorb a large amount of a biologically active substance (e.g., amino acid etc.) as a nutrient, as a result of which, for example, it is possible to increase milk yield production and the like.

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. A feed additive composition, comprising:
   (A) from 30 wt % to less than 60 wt %, based on the total weight of the composition, of at least one selected from the group consisting of hydrogenated vegetable oil and hydrogenated animal oil each having a melting point of from higher than 50° C. to lower than 90° C.;
   (B) from 0.05 wt % to 6 wt %; based on the total weight of the composition, of lecithin;
   (C) from 30 wt % to less than 65 wt %, based on the total weight of the composition, of a biologically active substance;
   (D) from 0.01 wt % to less than 0.8 wt %, based on the total weight of the composition, of a natural vegetable oil; and
   from 0.1 wt % to less than 6 wt %, based on the total weight of the composition, of water.

2. The composition according to claim 1, wherein the amount of the natural vegetable oil (D) is from 0.1 wt % to 0.4 wt %, based on the total weight of the composition.

3. The composition according to claim 2, wherein the natural vegetable oil (D) is at least one member selected from the group consisting of soybean oil, palm oil, rape seed oil, canola oil, olive oil, almond oil, avocado oil, and safflower oil.

4. The composition according to claim 2, wherein the natural vegetable oil (D) comprises from 60 wt % to 95 wt % of an unsaturated fatty acid, relative to the total content of fatty acids in the natural vegetable oil (D), having 18 carbon atoms.

5. The composition according to claim 2, wherein the natural vegetable oil (D) comprises from 55 wt % to 90 wt % of oleic acid, relative to the total content of fatty acids in the natural vegetable oil (D).

6. The composition according to claim 2, wherein the natural vegetable oil (D) is olive oil.

7. The composition according to claim 2, wherein the biologically active substance (C) is at least one member selected from the group consisting of an amino acid, a vitamin, and a vitamin substance.

8. The composition according to claim 1, wherein the natural vegetable oil (D) is at least one member selected from the group consisting of soybean oil, palm oil, rape seed oil, canola oil, olive oil, almond oil, avocado oil, and safflower oil.

9. The composition according to claim 8, wherein the natural vegetable oil (D) comprises from 60 wt % to 95 wt % of an unsaturated fatty acid, relative to the total content of fatty acids in the natural vegetable oil (D), having 18 carbon atoms.

10. The composition according to claim 8, wherein the natural vegetable oil (D) comprises from 55 wt % to 90 wt % of oleic acid, relative to the total content of fatty acids in the natural vegetable oil (D).

11. The composition according to claim 8, wherein the natural vegetable oil (D) is olive oil.

12. The composition according to claim 8, wherein the biologically active substance (C) is at least one member selected from the group consisting of an amino acid, a vitamin, and a vitamin substance.

13. The composition according to claim 1, wherein the natural vegetable oil (D) comprises from 60 wt % to 95 wt % of an unsaturated fatty acid, relative to the total content of fatty acids in the natural vegetable oil (D), having 18 carbon atoms.

14. The composition according to claim 1, wherein the natural vegetable oil (D) comprises from 55 wt % to 90 wt % of oleic acid, relative to the total content of fatty acids in the natural vegetable oil (D).

15. The composition according to claim 1, wherein the natural vegetable oil (D) is olive oil.

16. The composition according to claim 1. wherein the biologically active substance (C) is at least one member selected from the group consisting of an amino acid, a vitamin, and a vitamin substance.

17. The composition according to claim 1, wherein the melting point of the component (A) is from 55° C. to 80° C.

18. The composition according to claim 1, wherein the feed additive composition has a form of particles having a particle size of from 0.1 mm to 20 mm.

19. The composition according to claim 1, wherein the feed additive composition has a spherical, granular, pellet, rugby ball, pressed barley, of hen's egg shape.

20. The composition according to claim 1, wherein the amount of the natural vegetable oil (D) is from 0.01 wt % to 0.4 wt %, based on the total weight of the composition.

* * * * *